United States Patent
Mori et al.

(10) Patent No.: US 6,556,368 B1
(45) Date of Patent: Apr. 29, 2003

(54) DISK APPARATUS AND CONTROL METHOD THEREFOR

(75) Inventors: Kazunori Mori, Kawasaki (JP); Tatsuhiko Kosugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/412,039

(22) Filed: Oct. 4, 1999

(30) Foreign Application Priority Data

Nov. 27, 1998 (JP) .......................... 10-338079

(51) Int. Cl.[7] .............................................. G11B 21/02
(52) U.S. Cl. ...................................... 360/75; 360/77.04
(58) Field of Search .................................. 360/75, 77.04

(56) References Cited

U.S. PATENT DOCUMENTS 4,764,914 A * 8/1988 Estes et al. .......... 360/77.04 X
5,072,318 A * 12/1991 Yu ...................... 360/77.04 X
5,708,581 A * 1/1998 Martinez ............. 360/77.04 X

* cited by examiner

*Primary Examiner*—David Hudspeth
*Assistant Examiner*—K. Wong
(74) *Attorney, Agent, or Firm*—Greer, Burns & Crain, Ltd.

(57) ABSTRACT

A method for controlling a disk apparatus in which a head scans tracks on a disk to record or retrieve information. The method includes a position error detection procedure which detects a position error between said head and said track, a phase control procedure which advances a phase of said position error detected by said position error detection procedure by a predetermined value and a head control procedure which controls a position of said head according to the position error which is advanced in phase by said phase control procedure.

8 Claims, 8 Drawing Sheets

DISK APPARATUS AND CONTROL METHOD THEREFOR

BACKGROUND OF THE INVENTION

1. Field of the Invention

The present invention generally relates to a disk apparatus and control methods therefor, and more particularly to a disk apparatus in which recording and retrieving of data are performed with heads that follows tracks on a disk and a control method therefor.

2. Description of the Related Art

In magnetic disk drives, such as hard disk drives, concentric tracks are formed on a disk. A head follows the track and writes or reads information on the track. The head also reads servo information recorded at predetermined positions on the tracks. A head position is detected and, then, the head is controlled to follow the desired track.

In hard disk drives, disks are usually fixed to a spindle motor first and, after that, servo information is written to the disks. Therefore, a center of disk rotation coincides with a center of the concentric tracks. However, because of disk variation with temperature and time, the center of disk rotation may no longer coincide with the center of the concentric tracks. This causes so-called eccentricity.

SUMMARY OF THE INVENTION

It is a general object of the present invention to provide a disk apparatus and a control method therefore in which the above disadvantages are eliminated.

A more specific object of the present invention is to provide a disk apparatus and a control method therefore which achieves exact tracking error correction control against disk eccentricity.

The above objects of the present invention are achieved by a method for controlling a disk apparatus in which heads scan tracks on a disk to record or retrieve information. The method includes a position error detection procedure which detects a position error between the head and the track, a phase control procedure which advances a phase of the position error detected by the position error detection procedure by a predetermined value and a head control procedure which controls a position of the head according to the position error which is advanced in phase by the phase control procedure.

The above objects of the present invention are also achieved by an apparatus in which heads scan tracks on a disk to record or retrieve information. The disk apparatus includes a position error detection unit which detects a position error between the head and the track, a phase control unit which advances a phase of the position error detected by the position error detection unit by a predetermined value and a head control unit which controls a position of the head according to the position error which is advanced in phase by the phase control unit.

According to this invention, the phase of the detected position error is advanced by the predetermined value. Then, the heads are controlled according to the phase-advanced position error. Consequently, a delay of head control is compensated for so that tracking is performed exactly.

According to this invention, a position error is detected for each frequency and the phase of the detected position error is advanced by a predetermined value for each frequency. Then, the phase-advanced position errors are synthesized and the heads are controlled by the synthesized position error. Consequently, the tracking is performed exactly because it is possible to lead phase for each frequency.

Further, according to this invention, because the detection of position errors and leading phase of the position errors can be performed in order for each frequency, it is possible that a load of processing is reduced.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Recently, heads cannot follow tracks if there is a little eccentricity because recording density of disks is increasing. Therefore, conventionally, the disk eccentricity is detected and tracking error of the head is corrected using the detected eccentricity. There is a method for correcting tracking error caused by the disk eccentricity.

In the method, eccentricity values of a number of positions are detected and an average eccentricity value is stored in a memory. Then, a VCM (Voice Coil Motor) is controlled according to the average eccentricity value. Usually, a period of the eccentricity is the same as a period of one rotation of the disk. However, with an increase of the recording density, it is necessary to correct a tracking error against an eccentricity which has frequency components which are more than twice a rotational frequency.

However, as the frequency of eccentricity becomes higher, a phase delay in correction control is caused if only a correction value is added to an indication value. This causes a problem that proper correction for tracking error cannot be done.

First, a format of a magnetic disk which is provided in a magnetic disk drive will be explained.

Figure 1:
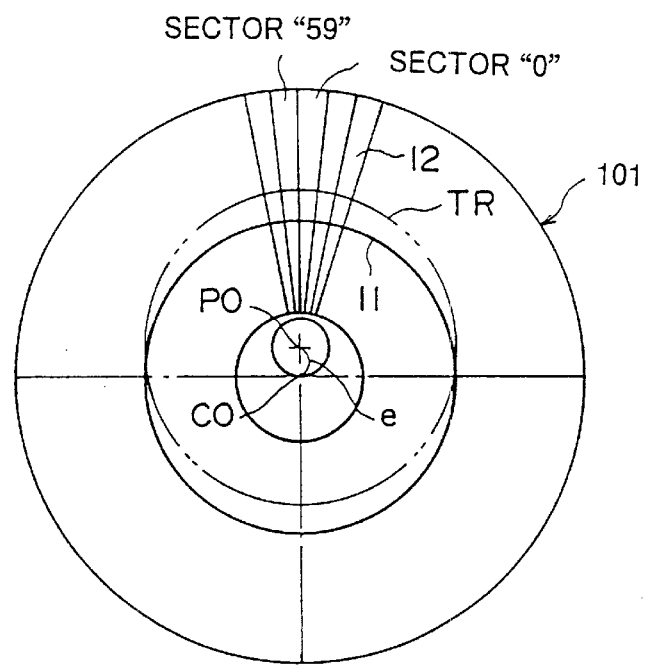
FIG. 1 is a format of a magnetic disk of an embodiment of the present invention.

FIG. 1 shows a format of a magnetic disk according to an embodiment of the present invention. Concentric recording tracks are formed on the magnetic disk 101. The center of the concentric recording tracks coincides with a center of the magnetic disk. A pitch between the adjacent tracks is, for example, 2.7 μm. Each recording track on the magnetic disk is divided into, for example, 60 sectors 12. Each sector includes a servo frame 15 and a data frame.

Next, the servo frame will be explained.

Figure 2:
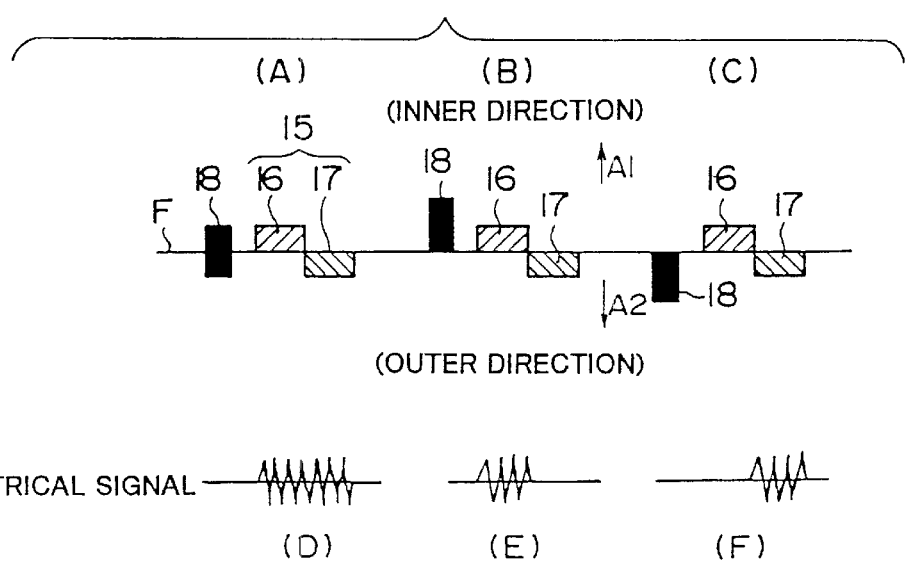
FIG. 2 is a configuration of servo frames of the magnetic disk of the embodiment of the present invention.

FIG. 2 is a configuration of servo frames on the magnetic disk according to the embodiment of the present invention. FIG. 2(A) shows a case where a magnetic head 18 is scanning a recording track 11 at a center of the recording track 11. FIG. 2(B) shows a case where the magnetic head 18 is scanning the recording track 11 with being shifted in an inner direction of the magnetic disk 101. FIG. 2(C) shows a case where the magnetic head 18 is scanning the recording track 11 while being shifted in an outer direction of the magnetic disk 101. FIG. 2(D) shows an electrical signal when the magnetic head 18 is scanning the recording track 11 at the center of the recording track 11. FIG. 2(E) shows an electrical signal when the magnetic head 18 is scanning the recording track 11 while being shifted ins the inner direction of the magnetic disk 101. FIG. 2(F) shows an electrical signal when the magnetic head 18 is scanning the recording track 11 while being shifted in the outer direction of the magnetic disk 101.

The servo frame 15 has a first servo marker 16 which is shifted in the inner direction (arrow A1) of the magnetic disk from the center F of the recording track 11 and a second servo marker 17 which is shifted in the outer direction (arrow A2) of the magnetic disk from the center F of the recording track 11.

As shown in FIG. 2(A), if a center of the magnetic head 18 coincides with the center F of the recording track 11, the magnetic head 18 equally scans both the first and the second servo markers 16 and 17 when the magnetic head 18 scans the recording track 11. Thus, a first reproduced signal from the first servo marker and a second reproduced signal from the second servo marker have the same signal level and both signals are concatenated as shown in FIG. 2(D).

As shown in FIG. 2(B), if the center of the magnetic head 18 is shifted from the center F of the recording track 11 in the inner direction of the magnetic disk 101, an area where the magnetic head 18 scans the first servo marker 16 is lager than an area where the magnetic head 18 scans the second servo marker 17. Therefore, the level of the signal from the first servo marker 16 is higher than the level of the signal from the second servo marker 17.

As shown in FIG. 2(C), if the center of the magnetic head 18 is shifted from the center F of the recording track 11 in the outer direction of the magnetic disk 101, an area where the magnetic head 18 scans the first servo marker 16 is smaller than an area where the magnetic head 18 scans the second servo marker 17. Therefore, the level of the signal from the first servo marker 16 is lower than the level of the signal from the second servo marker 17.

As mentioned above, a difference between the first reproduced signal level and the second reproduced signal level occurs according to the tracking state of the magnetic head 18. Therefore, a tracking error is detected according to the difference between the first and the second signal levels and the magnetic head 18 is shifted according to the tracking error. Thus, tracking control can be done.

Here, it is assumed that a distance between a center CO of the concentric tracks and a rotation center RO of the magnetic disk is "e".

Figure 3:
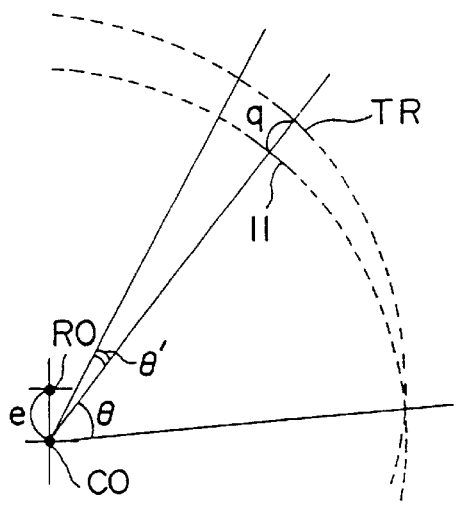
FIG. 3 shows eccentricity of the magnetic disk of the embodiment of the present invention.

FIG. 3 shows eccentricity of the magnetic disk of the embodiment of the present invention. FIG. 3 shows that the distance between the center CO of the concentric tracks and the center RO of rotation of the magnetic disk is "e".

A circle TR shows a trace of the magnetic head 18. The trace is shifted from the recording track 11. At each sector 12, the head trace TR to be followed by the head 18 is shifted by a shift value of q in the radial direction from the recording track 11.

Figure 4:
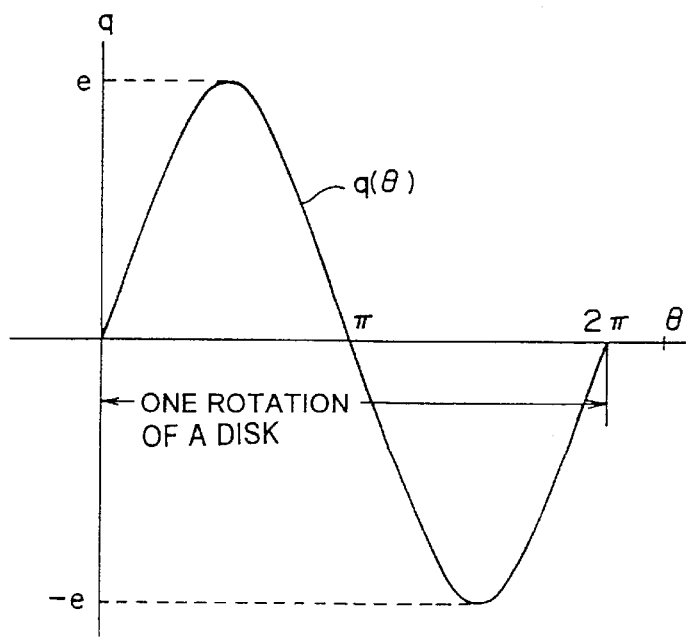
FIG. 4 shows a shift value during one rotation of the magnetic disk of the embodiment of the present invention.

FIG. 4 shows a shift value during one rotation of the magnetic disk of the embodiment of the present invention. A waveform q(θ) shows variation of the shift value q relative to a rotation angle θ of the magnetic disk. If a frequency of the waveform q(θ) is high, a correction operation for the magnetic head 18 cannot follow the waveform q(θ). Therefore, in the present invention, phase conversion blocks are provided to advance phases of correction values, so that the correction operation can follow the waveform q(θ) exactly.

Next, a configuration of the embodiment will be explained.

Figure 5:
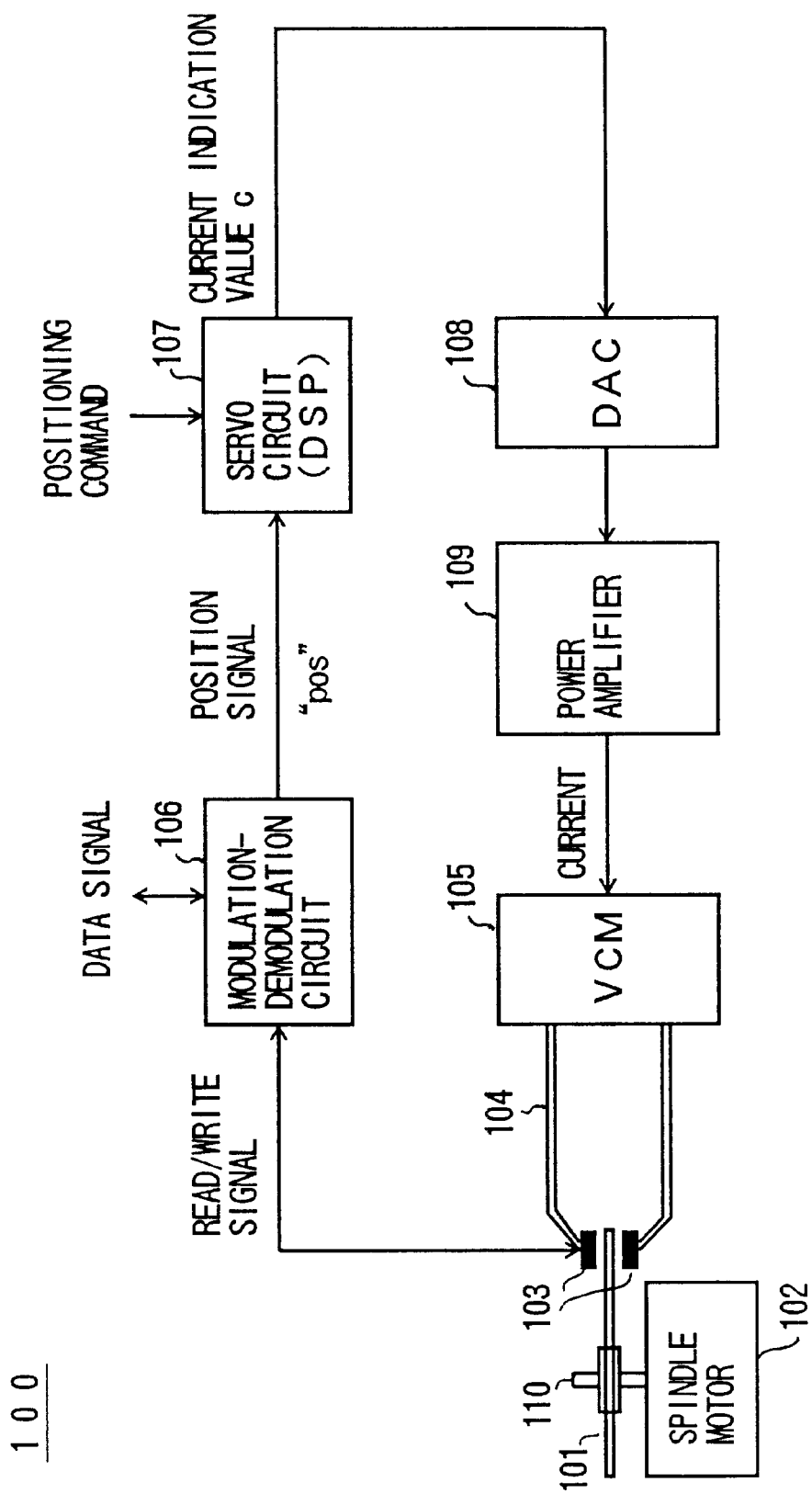
FIG. 5 is a block diagram of the embodiment of the present invention.

FIG. 5 is a block diagram of the embodiment of the present invention. A magnetic disk drive 100 of the embodiment includes a magnetic disk 101, a spindle motor 102, magnetic heads 103, carriages 104, a voice coil motor (VCM) 105, a modulation-demodulation circuit 106, a servo circuit 107, a digital analog converter (DAC) 108 and a power amplifier 109.

The rotation center CO of the magnetic disk 101 is fixed to a rotation axis 110 of the spindle motor 102. The spindle motor 102 rotates the magnetic disk 101 by means of rotating the rotation axis 110.

Magnetic heads 103 are fixed to carriages 104 and the magnetic heads 103 are located at opposite sides of the magnetic disk 101 respectively. The carriages 104 are fixed to the VCM 105. The VCM 105 moves the carriages 104 in the radial direction in order to make the magnetic heads 103 follow predetermined tracks on the magnetic disk 101.

The magnetic heads 103 are connected to the modulation-demodulation circuit 106. The magnetic heads 103 magnetically write information which is supplied from the modulation-demodulation circuit 106 to the magnetic disk 101. In addition, the magnetic heads 103 magnetically read information from the magnetic disk 101 and supply the information to the modulation-demodulation circuit 106.

The modulation-demodulation circuit 106 supplies a position signal "pos" which is detected from a signal read by the magnetic heads 103 to the servo circuit 107. The servo circuit 107 generates an electrical current indication value C according to both the position signal "pos" supplied from the modulation-demodulation circuit 106 and a positioning command. Then, the servo circuit 107 outputs the electrical current indication value C.

The electrical current indication value C which is output from the servo circuit 107 is supplied to the DAC 108. The DAC 108 converts the electrical current indication value C supplied from the servo circuit 107 into an analog signal. The analog signal converted by the DAC 108 is supplied to the power amplifier 109.

The power amplifier 109 amplifies the analog signal supplied from the DAC 108 and supplies the amplified analog signal to the VCM 105. The VCM 105 is driven to make the magnetic heads 103 follow predetermined tracks on the magnetic disk 101 according to the current supplied from the power amplifier 109.

Next, the servo circuit 107 which is the main part of the embodiment will be explained.

Figure 6:
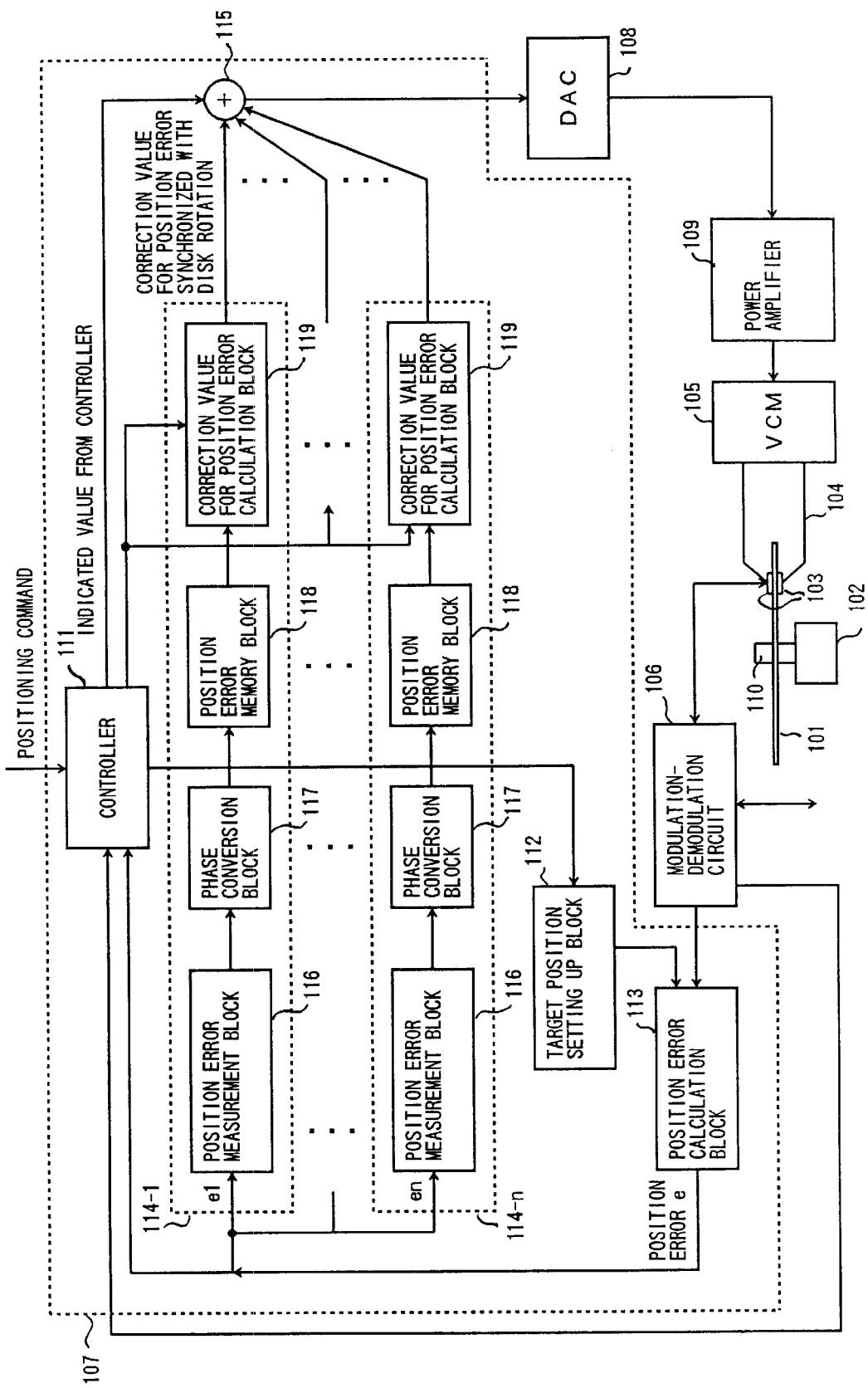
FIG. 6 is a block diagram of a servo circuit of the embodiment of the present invention.

FIG. 6 is a block diagram of the servo circuit 107 of the embodiment of the present invention.

The servo circuit 107 includes, for example, a Digital Signal Processor (DSP). The servo circuit 107 functionally includes a controller 111, a target position setting up block 112, a position error calculation block 113, position error correction blocks 114-1 to 114-n and an adder 115.

Positioning commands are provided to the controller 111 from the outside of the servo circuit 107. The servo circuit 107 outputs the indication value according to the positioning commands. The controller 111 is connected to the modulation-demodulation circuit 106 and supplied with the scanning position information of the magnetic head 103 on the magnetic disk 101.

The target position setting up block 112 is connected to the controller 111 and retains the target position information of the target track, which is supplied from the controller 111.

The position error calculation block 113 calculates a difference between the target position information retained in the target position setting up block 112 and current position information supplied from the modulation-demodulation circuit 106, i.e., the position error information "e" which is the error between the current position and the target position. The position error information "e" calculated by the position error calculation block 113 is supplied to the controller 111 and the position error correction blocks 114-1 to 114-n. The position error correction block 114-1 generates a correction value for a first-order frequency component f1 of the position error information "e". The position error correction block 114-2 generates a second-order correction value for a frequency component f2 of the position error information "e". Similarly, the position error correction block 114-n generates a correction value for an nth-order frequency component fn of the position error information "e".

The correction values which are generated by the position error correction blocks 114-1 to 114-n are supplied to the adder 115. The adder 115 adds the correction values which are generated by the position error correction blocks 114-1 to 114-n and an indication value which is output from the controller 111. The output of the adder 115 is supplied to the DAC 108.

Here, the position error correction blocks 114-1 to 114-n will be explained in detail.

The position error correction blocks 114-1 to 114-n includes a position error measurement block 116, a phase conversion block 117, a position error memory block 118 and a correction value for position error calculation block 119.

Each position error measurement block 116 measures one of position error information "e1" to "en" of the position error information "e", each of "e1" to "en" corresponding to one of frequency components from f1 to fn. Then, the position error measurement blocks 116 detect variables "a" and "b" from the position error information "e1" to "en". The position error information "e1" to "en" detected by the position error measurement blocks 116 is supplied to the phase conversion blocks 117.

The phase conversion blocks 117 shift phases of the variables "a" and "b" for the position error information "e1" to "en" by predetermined phase values $\Delta\theta 1$ to $\Delta\theta n$. The phase-shifted position error information "e1" to "en" is supplied to the position error memory blocks 118.

The position error memory blocks 118 store the position error information "e1" to "en" supplied from the phase conversion blocks 117 into locations which are phase-shifted. The position error information "e1" to "en" stored in the position error memory blocks 118 is supplied to the correction value for position error calculation blocks 119.

The correction values for position error calculation blocks 119 are connected to both the position error memory blocks 118 and the controller 111. The correction value for position error calculation blocks 119 read the position error information "e1" to "en" stored in the position error memory blocks 118 according to position information supplied from the controller 111 and output corrected position errors.

The corrected position errors which are output from the correction value for position error calculation blocks 119 are supplied to the adder 115.

The adder 115 adds the corrected position errors which are output from the correction value for position error calculation blocks 119 to the indication value supplied from the controller 111 and outputs an added value. The added value by the adder 115 is supplied to the DAC 108.

Next, a process of a command processing task for the magnetic disk drive 100 will be explained.

Figure 7:
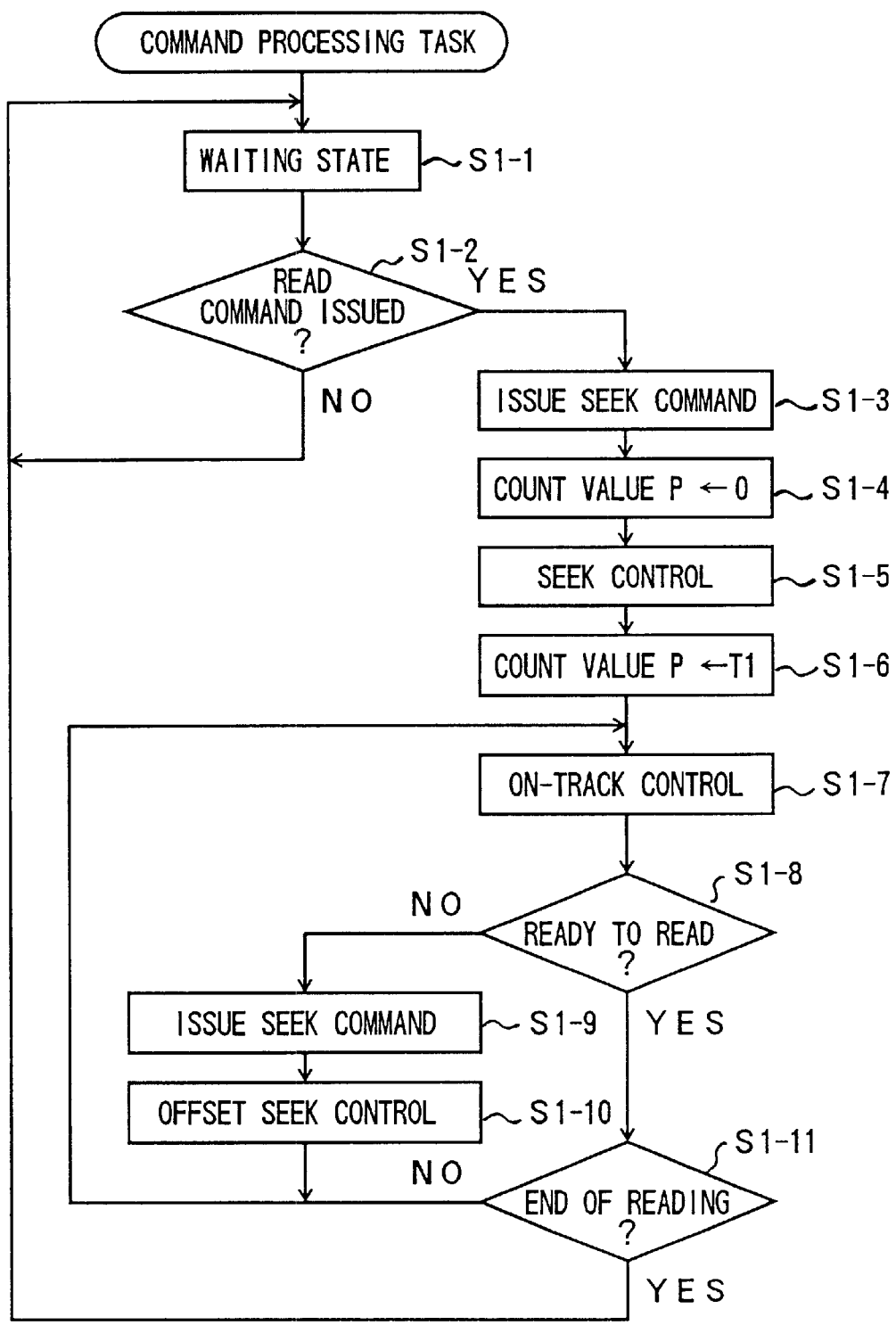
FIG. 7 is a flow chart of a command processing task of the embodiment of the present invention.

FIG. 7 shows a flow chart of the command processing task of the embodiment of the present invention. When the magnetic disk drive 100 is supplied with power, the command processing task is started.

In the command processing task, the magnetic disk drive 100 is in the waiting state until a read command is supplied from the host computer. These commands are monitored at steps S1-1 and S1-2.

Next, a seek command is issued at a step S1-3 when a read command is supplied from the host computer at the steps S1-1 and S1-2. Then, a count value P of a counter is set to zero at a step S1-4.

This counter operates as an on-off switch in the position error correction blocks 114-1 to 114-n, as described later.

The seek operation is done at a step S1-5 after the count value P of the counter has been set to zero at the step S1-4.

When the head is positioned at a target cylinder at the step S1-5, then, the count value P of the counter is set to a predetermined value T1 at a step S1-6. The predetermined value T1 is greater than a number of sectors of one round.

Next, on-track control is executed using the indication value C supplied from the servo circuit 107 at a step S1-7 after the count value P of the counter is set to a predetermined value T1 at the step S1-6. The magnetic head 103 follows the target track by means of the on-track control at the step S1-7.

It is judged whether the magnetic head 103 can read data from the target track at a step S1-8 after the on-track control is executed at the step S1-7. If the data is not readable by the head 103, then, the seek command is issued again at a step S1-9. Then an offset-seek operation is executed at a step S1-10. The magnetic head 103 is slightly shifted in a radial direction by the seek command. Then, the on-track control is executed at the step S1-7 again.

If the magnetic head 103 can read data from the target track at the step S1-8, then, it is judged whether all needed data has been read at a step S1-11. After all needed data is read, the magnetic disk drive goes into the waiting state at the step S1-1 again. When all needed data is not read completely, the on-track control at the step S1-7 is continued.

Next, the position error correction blocks 114-1 to 114-n will be explained.

Figure 8:
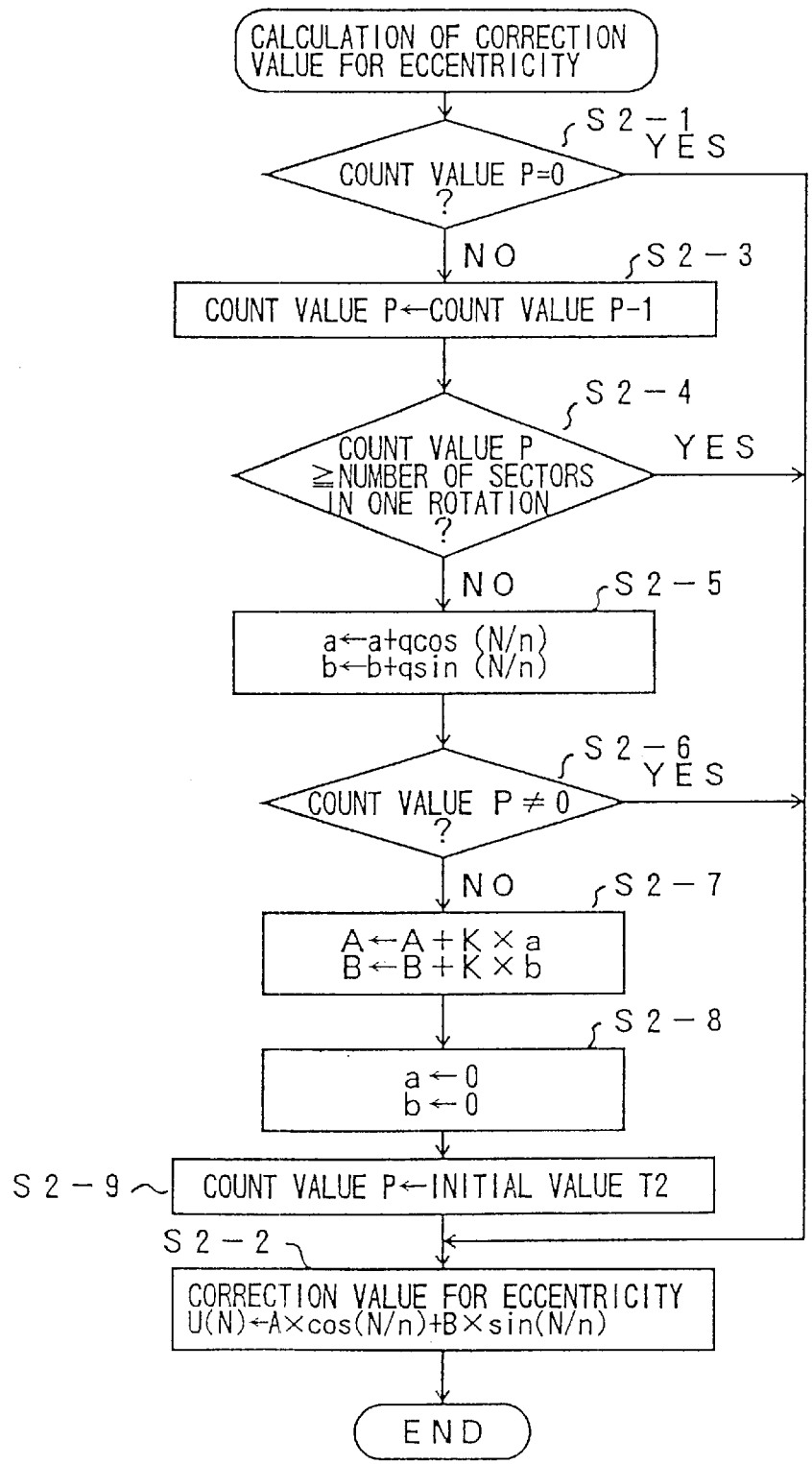
FIG. 8 is a flow chart of an operation of a position error correction block of the embodiment of the present invention.

FIG. 8 is a flow chart of an operation of the position error correction blocks of the embodiment of the present invention.

Calculation of the correction value by the position error correction blocks is executed every time the magnetic head 103 passes through each servo frame.

First, it is judged whether the count value P equals zero at a step S2-1. When it is judged that the count value P equals zero at the step S2-1, then the position error correction blocks calculate the correction value u(N) for the position error or eccentricity at a step S2-2. The correction value u(N) for the position error or eccentricity is expressed as follows:

$$U(N)=A \times \cos(N/n)+B \times \sin(N/n)$$

where A is a cosine amplitude, B is a sine amplitude, N is a sector number and n is a number of the position error correction blocks 114-1 to 114-n.

The count value P is judged as to whether it is zero at the step S2-1. When the count value P is equal to zero, it is judged that a seek control is being executed. It is impossible to detect the eccentricity while the seek control is being executed because the magnetic head 103 crosses tracks. The measurement of the eccentricity is not executed while the seek control is being executed.

Then, the position error measurement blocks 116 output both the variables a and b which are equal to zero. The variables a and b which are output from the position error measurement blocks 116 are stored in the position error memory blocks 118 as the cosine amplitude A and the sine amplitude B through the phase conversion blocks 117.

Both the cosine amplitude A and the sine amplitude B for each magnetic head 103 are stored in the position error memory blocks 118. Therefore, if the position error information "e" has a different value in each part of the magnetic disk 101, it is possible to make the magnetic head follow the recording tracks exactly by using the cosine amplitude A and the sine amplitude B for each magnetic head 103.

The position error memory block 118 retains the cosine amplitude A and the sine amplitude B which were used when the former on-track control was executed. The eccentricity or the position error information "e" of the magnetic disk 101 is not changed even if the magnetic head 103 moves from one track to another track. Use of the former cosine amplitude A and the sine amplitude B prevents the correction value u(N) for position error or eccentricity from switched instantaneously. This also prevents the magnetic head 103 from being fluctuating. For example, zero is stored for both the cosine amplitude A and the sine amplitude B in the position error memory blocks 118 when the magnetic disk drive is shipped.

The cosine amplitude A and the sine amplitude B which were stored when the power of the magnetic disk drive was shut down may also be used as initial values for the cosine amplitude A and the sine amplitude B when the power is supplied to the magnetic disk drive again. This can be achieved by using a non-volatile memory to store the initial values. These initial values can make a trace of the magnetic head converge to the target recording track promptly.

These initial values may be set based on measured eccentricity which is measured when the magnetic disk drive is shipped. It is desired to prevent the correction value from being calculated according to a host command when the eccentricity is measured.

However, it is not needed to prevent the correction value from being calculated while the offset-seek at the step S1-9 shown in FIG. 7 is being executed in case that a seek command is issued because the magnetic head is positioned before the offset-seek is executed and does not cross the several recording tracks. As a result, the eccentricity "e" is measured promptly while the offset-seek is being executed when the same seek command is issued. Therefore, a trace of the magnetic head converges to the target recording track promptly.

When the count value P is not equal to zero, it is judged that the seek control is not being executed. Then, the count value P is decreased by one (P−1) at a step S2-3.

Next, the count value P is compared with a number of sectors in one round of a track at a step S2-4. If the count value P is equal to or larger than the number of sectors in one round, then the correction value u(N) for the position error or the eccentricity is calculated by the correction value for position error calculation blocks 119.

If the count value P is smaller than the number of sectors in one round, the variables a and b are measured and calculated. The variables a and b are calculated as follows:

$$a=a+q \times \cos(N/n) \quad (1)$$

$$b=b+q \times \sin(N/n) \quad (2)$$

While the count value P is equal to or larger than the number of sectors in one round, the steps from S2-1 to S2-4 are repeated without measuring and calculating the variables a and b. The correction value u(N) for the position error or the eccentricity is calculated by the correction value for position error calculation blocks 119 and correction is performed. Therefore, the position of the magnetic head 103 is stabilized. The measurement and the calculation for the variables a and b are executed after the position of the magnetic head 103 is stabilized and the count value P becomes equal to the number of sectors S in one round.

The variables a and b measured and calculated by the position error measurement blocks 116 are expressed in the expressions (1) and (2). These expressions show that a term q×cos(N/n) or q×sin(N/n) based on a present measured value q is added to former variables a and b, and this measurement and calculation are repeated. The result of the calculation of the variables a and b is stored to the position error memory blocks 118 through the phase conversion blocks 117. The variables a and b corresponding to the position error are calculated by the phase conversion blocks 117 by using a phase shift value Δθn added to the term N in the expressions (1) and (2). Then the variables a and b are stored to the position error memory blocks 118.

These calculations are repeated until the count value P becomes zero at a step S2-6. That is to say, the steps from S2-1 to S2-6 are repeated until the count value P becomes zero at a step S2-6. As a result, the sum of the variables a and the sum of the variables b corresponding to the position error are calculated over one round of a track and stored.

When the count value P becomes zero at a step S2-6, the variables a and b corresponding to the position error stored in the position error memory blocks 118 are multiplied by a coefficient K in the correction value for position error calculation blocks 119. Then the variables a and b are added to the former cosine amplitude A and the former sine amplitude B and stored in the position error memory blocks 118. That is to say, the cosine amplitude A and the sine amplitude B are calculated as follows at a step S2-7.

A=A+K×a

B=B+K×b

As described above, the cosine amplitude A and the sine amplitude B are calculated by multiplying K with the variables a and b corresponding to the position error to reduce an influence of the variables a and b.

The variables a and b corresponding to the position error are initialized at a step S2-8 after the cosine amplitude A and the sine amplitude B are obtained.

Subsequently, the count value P is set to a count number T2 at a step S2-9. This count number T2 is the same number as a number of sectors of one round. Therefore, measurement of eccentricity can be started without waiting time for a second round.

Figure 9:
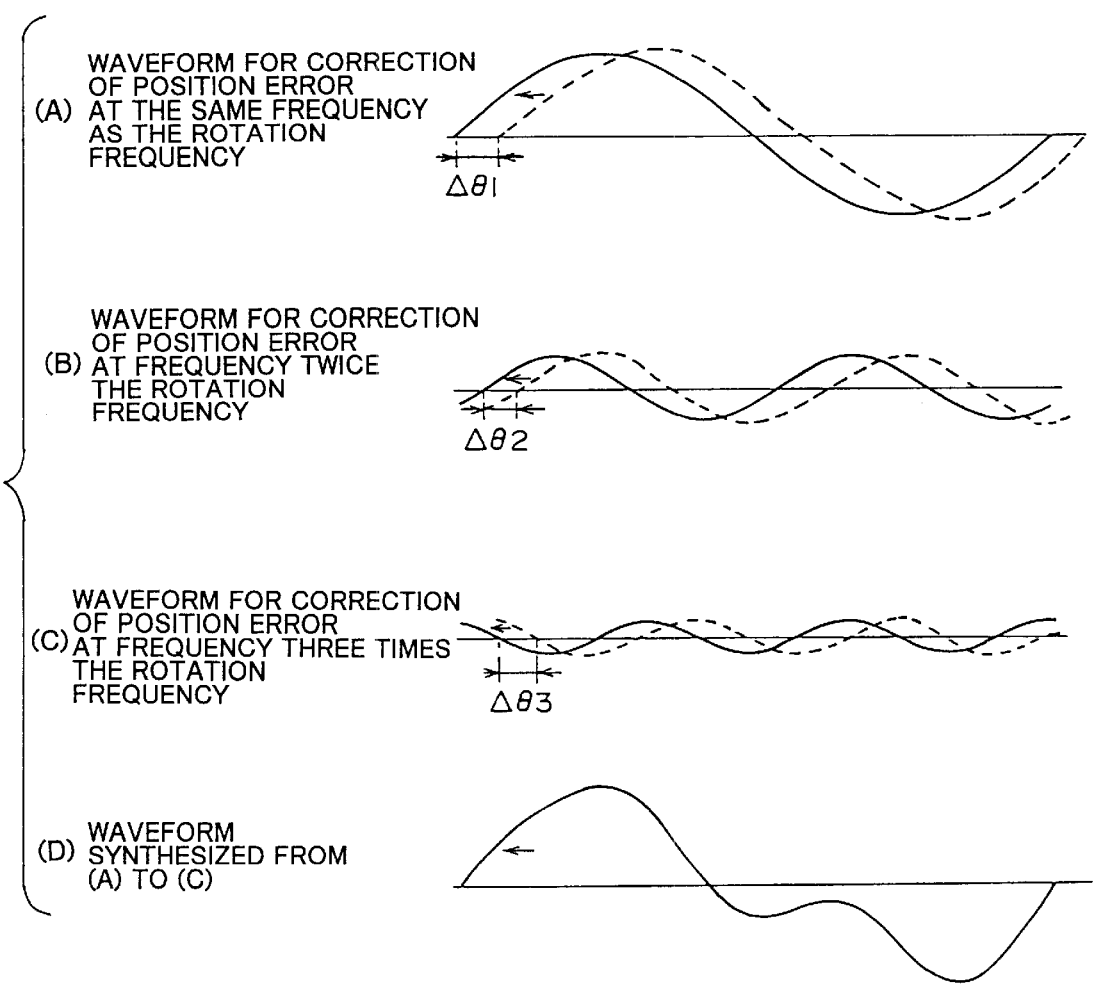
FIG. 9 shows an operation of the embodiment of the present invention.

FIG. 9 shows an operation of the embodiment of the present invention. FIG. 9(A) shows a waveform for correction of the position error at the same frequency as a rotation frequency of the magnetic disk. FIG. 9(B) shows a waveform for correction of the position error at a frequency twice the rotation frequency of the magnetic disk. FIG. 9(C) shows a waveform for correction of the position error at a frequency three times the rotation frequency of the magnetic disk. FIG. 9(D) shows a waveform synthesized from these three waveforms. Solid lines in FIG. 9 show phase-shifted correction waveforms for position error and dotted lines show detected waveforms of position error.

The position error correction block 114-1 generates the waveform for correction of the position error at the same frequency as a rotation frequency of the magnetic disk as shown in FIG. 9(A). The position error correction block 114-2 generates the waveform for correction of the position error at the frequency twice the rotation frequency of the magnetic disk as shown in FIG. 9(B). The position error correction block 114-3 generates the waveform for correction of the position error at the frequency three times the rotation frequency of the magnetic disk shown in FIG. 9(C). For example, when the position error correction blocks 114-1 to 114-n are the position error correction blocks 114-1 to 114-3, the synthesized waveform for correction of the position error is the sum of the waveforms output from the position error correction blocks 114-1 to 114-3.

As shown by a dotted line in FIG. 9(A), the waveform generated by the position error correction block 114-1 is a correction waveform which leads by a phase shift value $\Delta\theta1$ an actually calculated waveform shown with a solid line. As shown a dotted line in FIG. 9(B), the waveform generated by the position error correction block 114-2 is a correction waveform which lead by a phase shift value $\Delta\theta2$ an actually calculated waveform shown with a solid line. As shown a dotted line in FIG. 9(C), the waveform generated by the position error correction block 114-3 is a correction waveform which leads by a phase shift value $\Delta\theta3$ an actually calculated waveform shown with a solid line.

As described above, the delays of the waveforms can be compensated for by using the phase shift value $\Delta\theta1$ to $\Delta\theta3$ set for the frequencies of the waveform which are calculated by the position error correction blocks 114-1 to 114-3. These waveforms from the position error correction blocks 114-1 to 114-3 are added to an indication value from the controller 211 so that a synthesized waveform is generated. Then, the magnetic head 103 is controlled by the synthesized waveform. As a result, it is possible to perform exact position control for the magnetic head 103.

In this embodiment, the position error correction blocks 114-1 to 114-n are provided in parallel and the waveforms for different frequencies are obtained at the same time. However, it is also possible to obtain waveforms with different frequencies and different phases according to a rotation frequency of the magnetic disk 103.

Figure 10:
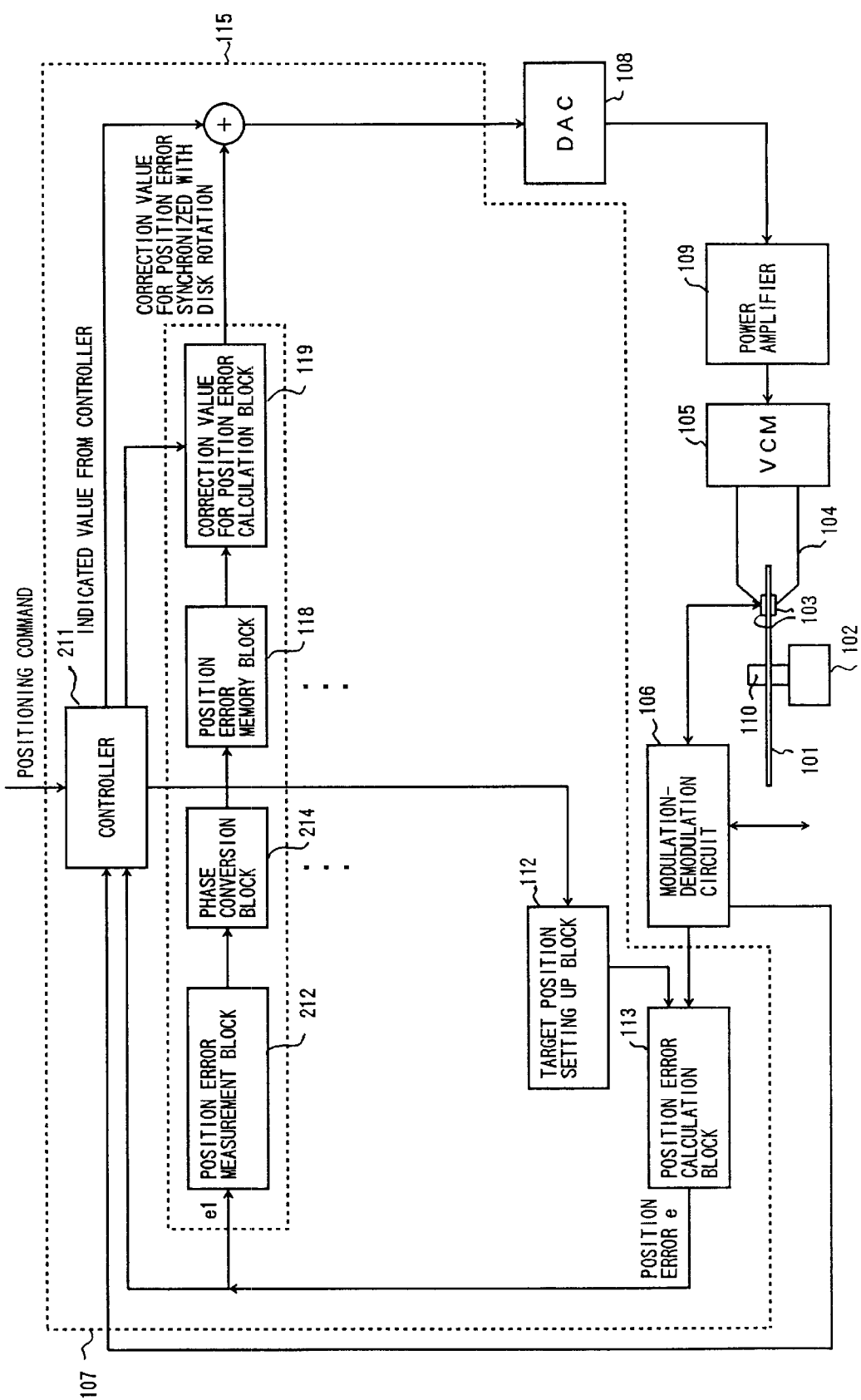
FIG. 10 is a block diagram of another embodiment of the present invention.

FIG. 10 is a block diagram of another embodiment of the present invention. The components which have the same reference numbers are the same components as those shown in FIG. 6 and an explanation is omitted.

In this embodiment, a frequency of a position error to be measured by a position error measurement block 213 in a position error correction block 212 is switched from f1 to fn one after another according to commands from a controller 211. Furthermore, a phase shift value to be set by a phase conversion block 214 is switched from $\Delta\theta1$ to $\Delta\theta n$ one after another according to commands from a controller 211.

The controller 211 switches both the frequency of the position error to be measured by the position error measurement block 213 in the position error correction block 212 from f1 to f2 and the phase shift value from $\Delta\theta1$ to $\Delta\theta2$ after predetermined rotations of the magnetic disk. Then, the controller 211 switches both the frequency of the position error to be measured by the position error measurement block 213 in the position error correction block 212 from f2 to f3 and the phase shift value from $\Delta\theta2$ to $\Delta\theta3$ after predetermined rotations of the magnetic disk. The operations described above are performed one after another. As a result, the correction waveforms for frequencies f1 to fn are obtained.

In this embodiment, it is not needed to perform position error correction at the same time. Therefore, a load of processing is reduced.

As described above, it is possible to make the magnetic head follow the recording tracks exactly.

The present invention is not limited to the specifically disclosed embodiments, and variations and modifications may be made without departing from the scope of the present invention.

The present application is based on Japanese priority application No. 10-338079 filed on Nov. 27, 1998, the entire contents of which are hereby incorporated by reference.

What is claimed is:

1. A method for controlling a disk apparatus in which a head scans tracks on a disk to record or retrieve information, the method comprising the steps of:

(a) detecting a position error between said head and said tracks;

(b) advancing a phase of said position error detected by said step (a) by a predetermined value; and (c) controlling a position of said head according to the position error which is advanced in phase by said step (b).

2. The method as claimed in claim 1, wherein said step (a) comprises a step of detecting frequency components in said position error;

said step (b) advances the phases of said frequency components in said position error detected by said step (a) by a predetermined value; and said step (c) controls said head position with a synthesized position error which is synthesized from said frequency components in said position error that are advanced in phase.

3. The method as claimed in claim 2, wherein said step (a) detects said frequency components in said position error in order every predetermined number of disk rotations and said step (b) controls phases of said frequency components in said position error.

4. A disk apparatus in which a head scans tracks on a disk to record or retrieve information, the disk apparatus comprising:

a position error detection part which detects a position error between said head and said tracks;

a phase control part which advances a phase of said position error detected by said position error detection part by a predetermined value; and a head control part which controls a position of said head according to the position error which is advanced in phase by said phase control part.

5. The disk apparatus as claimed in claim 4, wherein said position error detection part detects frequency components in said position error;

said phase control part advances the phases of said frequency components in said position error detected by said position error detection part by a predetermined value; and said head control part controls said head position with a synthesized position error which is synthesized from said frequency components in said position error that are advanced in phase for each frequency.

6. The disk apparatus as claimed in claim 5, wherein said position error detection part detects said frequency components in said position error in order every predetermined number of disk rotations and said phase control part controls phases of said frequency components in said position error.

7. The method as claimed in claim 1, wherein said predetermined value equals N times the rotation frequency of the disk, where N equals to an nth-order of a frequency component of the position error.

8. The disk apparatus as claimed in claim 4, wherein said predetermined value equals N times the rotation frequency of the disk, where N equals to an nth-order of a frequency component of the position error.

* * * * *